March 7, 1961
S. WAGTER
2,973,721
CONVEYOR SYSTEM
Filed Nov. 12, 1957
6 Sheets-Sheet 1
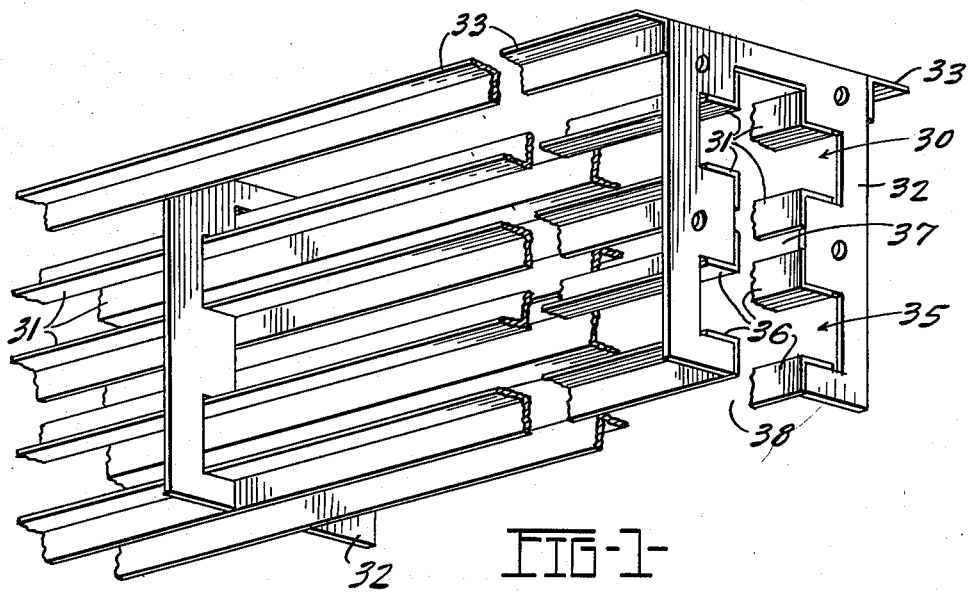
FIG-1-
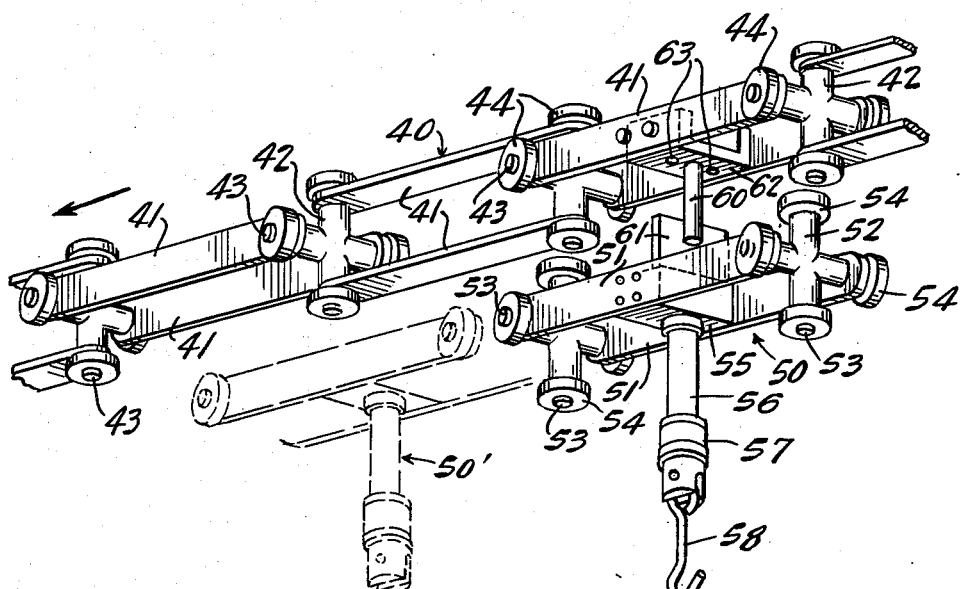
FIG-2-
INVENTOR:
SJIRK WAGTER.
BY
*Hugh A Kirk*
ATTY.

March 7, 1961 S. WAGTER 2,973,721
CONVEYOR SYSTEM
Filed Nov. 12, 1957 6 Sheets-Sheet 2
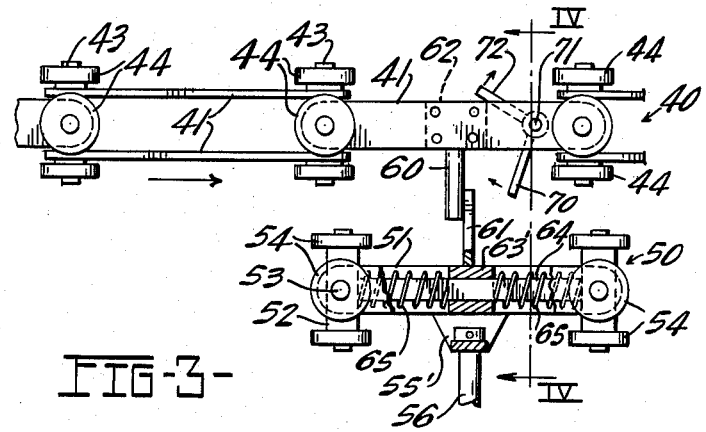
FIG-3-
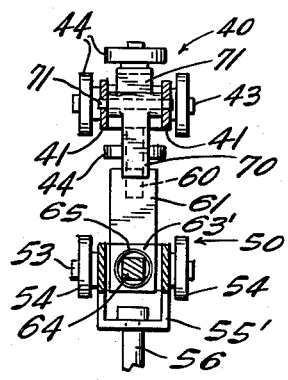
FIG-4-
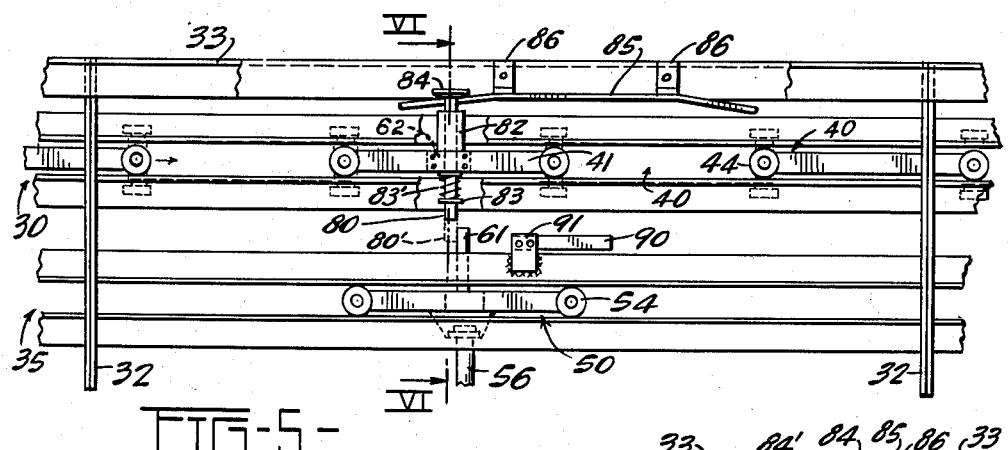
FIG-5-
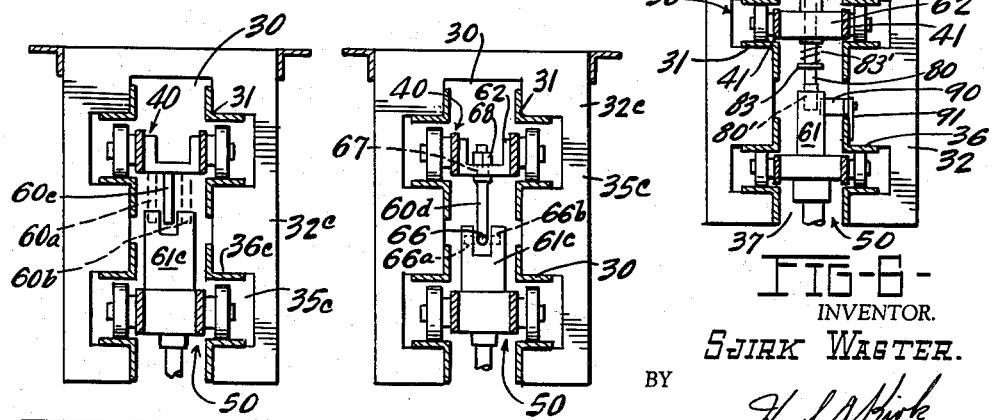
FIG-20- FIG-21- FIG-6-
INVENTOR.
SJIRK WAGTER.
BY
ATTY.

March 7, 1961 S. WAGTER 2,973,721
CONVEYOR SYSTEM
Filed Nov. 12, 1957 6 Sheets-Sheet 3
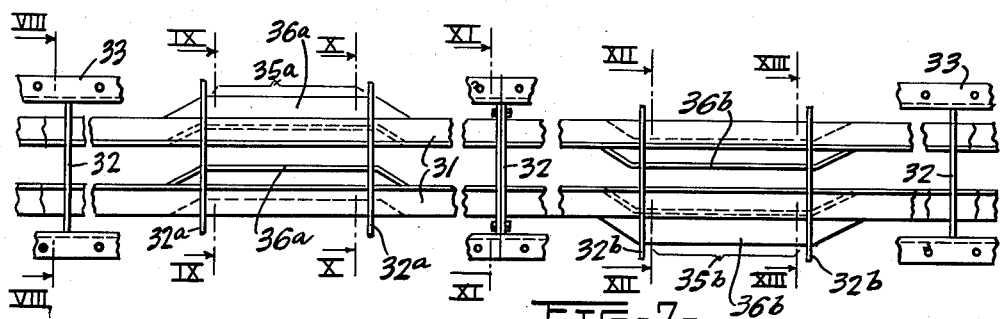
FIG-7-
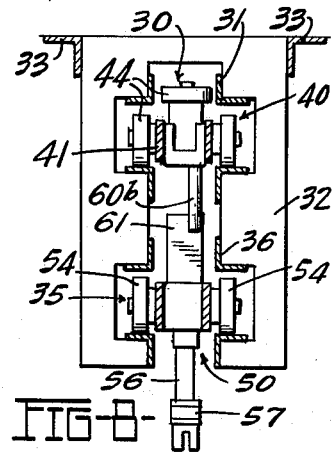
FIG-8-
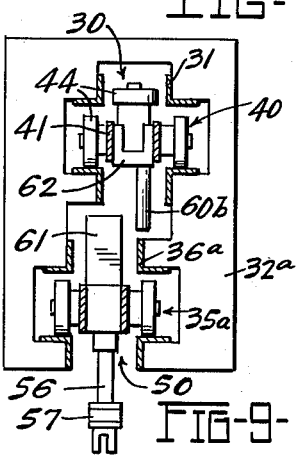
FIG-9-
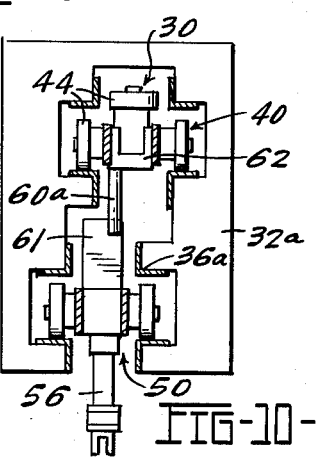
FIG-10-
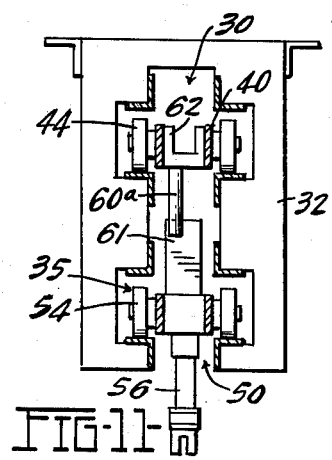
FIG-11-
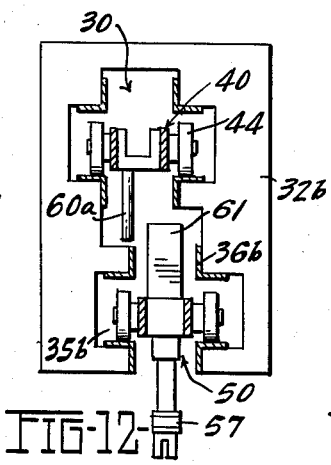
FIG-12-
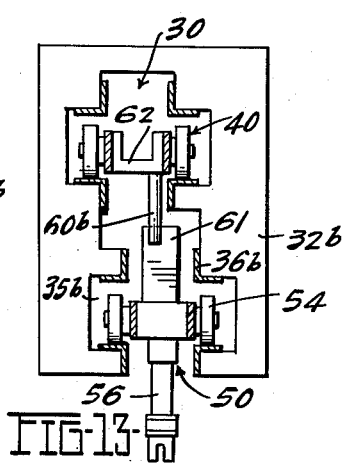
FIG-13-
INVENTOR:
SJIRK WAGTER.
BY
ATT'Y.

March 7, 1961  S. WAGTER  2,973,721
CONVEYOR SYSTEM
Filed Nov. 12, 1957  6 Sheets-Sheet 4

INVENTOR:
SJIRK WAGTER.
BY
ATT'Y.

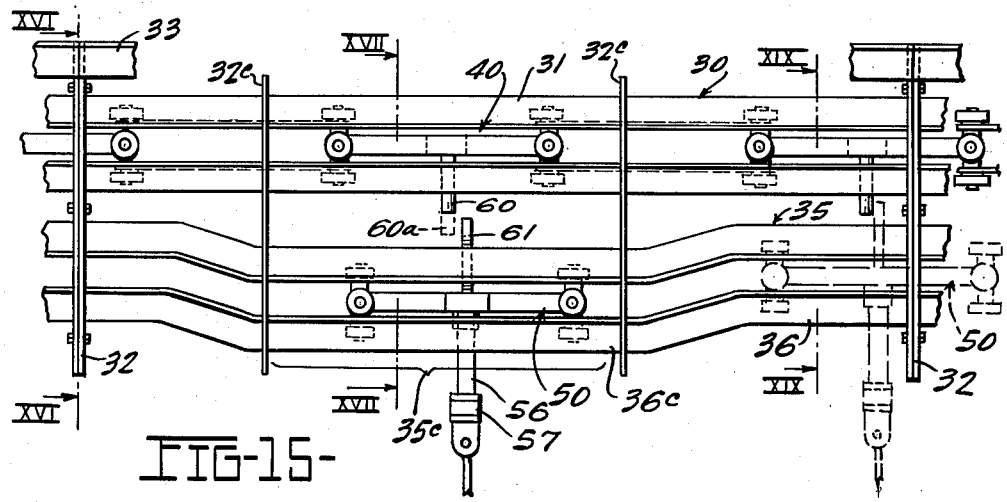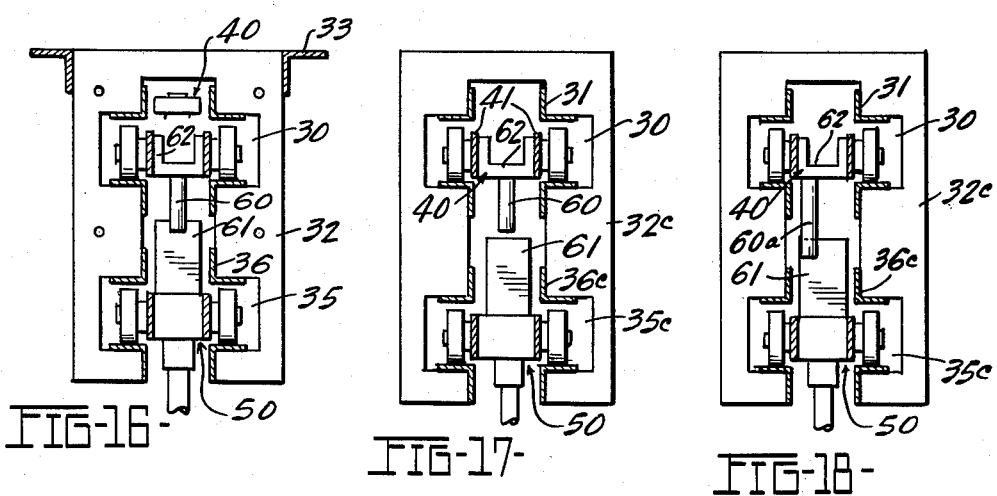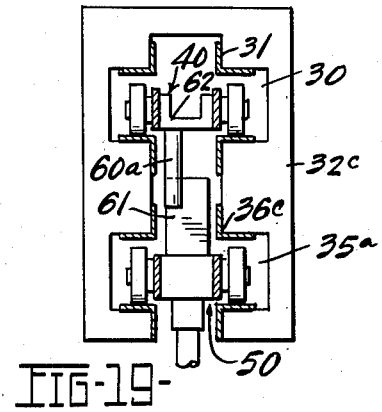

United States Patent Office 2,973,721
Patented Mar. 7, 1961

2,973,721

CONVEYOR SYSTEM

Sjirk Wagter, The Hague, Netherlands, assignor to Staatsbedrijf der Poslerijen Telegrafie en Telefonie, The Hague, Netherlands Filed Nov. 12, 1957, Ser. No. 695,923

34 Claims. (Cl. 104—172)

This invention relates to a conveyor system for transporting bulky objects or articles. More particularly, it deals with an endless continuously moving transporting chain which automatically moves and stops separate load carrying trolleys along a track adjacent to the path of the chain, such as for example in a conveyor system for transporting mail bags through a Post Office sorting station with stops at intervals along the path of the chain for reading of the tags on the bags and/or attaching or detaching them from the trolleys before the trolleys are moved to another point along their path.

Previously, transporting chain conveyors for moving load carrying trolleys along adjacent tracks to the path of the conveyor have been employed with detours along the track where the trolleys are released from being driven by the chain conveyor until they are moved again into the path of the conveyor chain to be carried further by the chain. However, such systems require considerable space, particularly for the detour paths for the trolleys, and they provide no automatic pick-up of the trolleys after they are stopped without some positive action by the attendant at the station or detour path where they are stopped. On the other hand, loading and unloading of such conveyors at continuous speeds greater than ten meters per minute in order to have a larger productive capacity, meets with difficulties because of insufficient time for observing the transported goods, that is, to find out by means of attached marks whether the goods on the trolleys are destined for the point being passed or whether they must travel further. This time also becomes too short for loading and/or unloading the trolleys.

Accordingly it is an object of this invention to produce a simple, efficient, effective, compact and economic conveying system for automatically stopping and starting trolleys at pre-determined locations along a continuously moving conveyor path.

Another object is to produce such a conveyor system which has a wide degree of adjustability and variations whereby a series of trolleys, moved by a continuous conveyor chain at a speed greater than ten meters per minute, may be disengaged or moved free of the conveyor chain at predetermined stations and then automatically picked up at pre-determined periods of time thereafter for further movement along the path of the conveyor chain.

Another object is to produce such a conveyor system in which different sequences of trolleys or all the trolleys may be stopped at any particular station or stations for periods of time depending upon the operation to be performed at that station, such as just reading the tags on the goods, or loading and/or unloading the goods from the trolleys.

Another object is to produce such a system which may follow any type of three dimensional circuituous continuous path through which the conveyor chain for driving the trolleys of the system can be directed.

This application is a continuation-in-part application of Sjirk Wagter, U.S. patent application Serial No. 436,578, filed June 14, 1954, for "Conveyor for Transporting Bulk goods," now abandoned.

Generally speaking, this invention comprises a conveyor system having a pair of adjacent tracks substantially parallel to each other, a continuous conveyor chain guided along one of said tracks and a plurality of separate trolleys movable along the other of said tracks by pushing engagement with specific different types of driving means located at predetermined spaced intervals along the conveyor chain. The different types of driving means on the movable conveyor chain which engage the driven means on the trolleys are moved relatively to each other into and out of engagement at the stations along the track at which the trolleys are to be automatically picked up and stopped, respectively. Thus at one particular location one type of driving or engaging means along the conveyor may disengage all or a part of the trolleys while another type of engaging means may engage all or a part of the trolleys, so that the distance between the two different types of driving or engaging means on the conveyor and the rate of movement of the conveyor determines the time that a trolley will remain disengaged or stopped at that particular location.

The driving or engaging means on the conveyor comprises pushing pins located in different relative positions transverse of the direction of movement of the conveyor and trolleys, and/or the driven or engaged means or plate on the trolleys so located, moved or configured to engage certain types of engaging means or pushing pins and not others, to give a desired interrupted movement at certain stations for specific ones of the trolleys along the conveying path. The numbers of different types of engaging means may be two or more and they are not only located in different relative positions on the conveyor or trolley but also may be of different shapes and sizes, so that at different stations either a portion of the track for the trolleys is biased or offset slightly for co-operation with one type of engaging means so that it will disengage the trolley and another type will not, and/or the engaging means or pins themselves are moved by fixed cams to disengage the trolleys at the stations where the trolleys are to be stopped for a given period of time.

The engaging means either on the trolley or the conveyor chain or both may be resiliently mounted to reduce the shock of engagement when a trolley at rest is picked up by the conveyor engaging means moving at a relatively high speed. This may be accomplished by providing a spring mounting for one of the engaging or engaged members, preferably the engaged plate mounted on the trolley.

Braking means may be provided at the stations for slowing down the trolleys after they are are disengaged, and also means may be provided adjacent the engaging or driving means on the conveyor to maintain the trolleys in engagement with the engaging means regardless of the speed, slope, or direction up or down along which they are being pushed or guided by the engaging means.

The trolleys or load carriers may be provided with platforms, troughs, hooks or other means for carrying loads which may be suspended or otherwise supported by the trolleys movable along the track substantially parallel to that for the continuously moving conveyor chain.

Both the conveying chain and the trolleys are guided along their tracks or rails by rollers or the like located at right angles to each other, so that the path for the conveyor of this invention follows almost any upward, downward, horizontal or intermediate curved or angular direction in three dimensional space.

The above mentioned and other features and objects of this invention and the manner of attaining them will become more apparent and the invention itself will be best understood by reference to the following description of a few embodiments of this invention taken in conjunction with the accompanying drawings, wherein:

Fig. 1 is a type of perspective view of a section of a dual track assembly which may be employed by a continuous conveyor and multitrolley system according to one embodiment of this invention;

Fig. 2 is a perspective view showing a section of one embodiment of a conveyor chain and one trolley which may be moved thereby, such as from the full line to its dotted line position, as they would move along the dual track assembly shown in Fig. 1;

Figure 14:
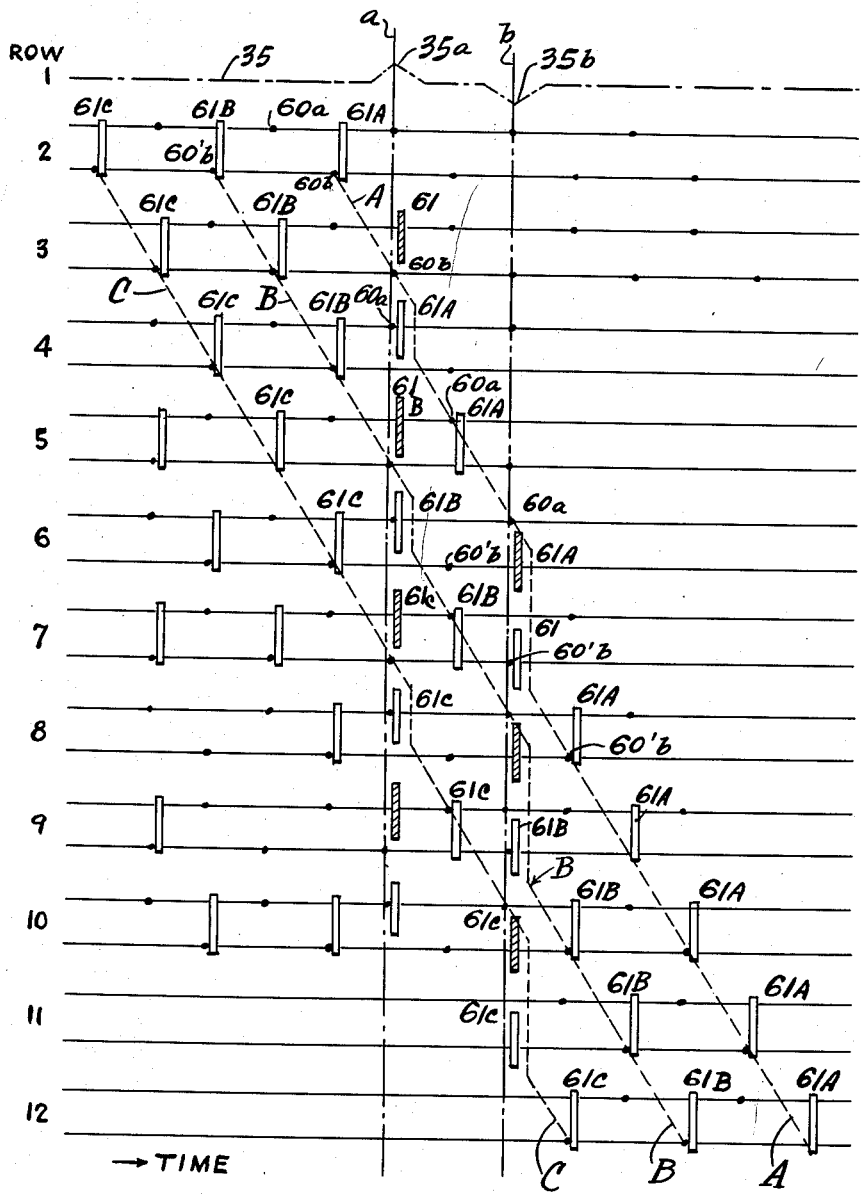
Figure 22:
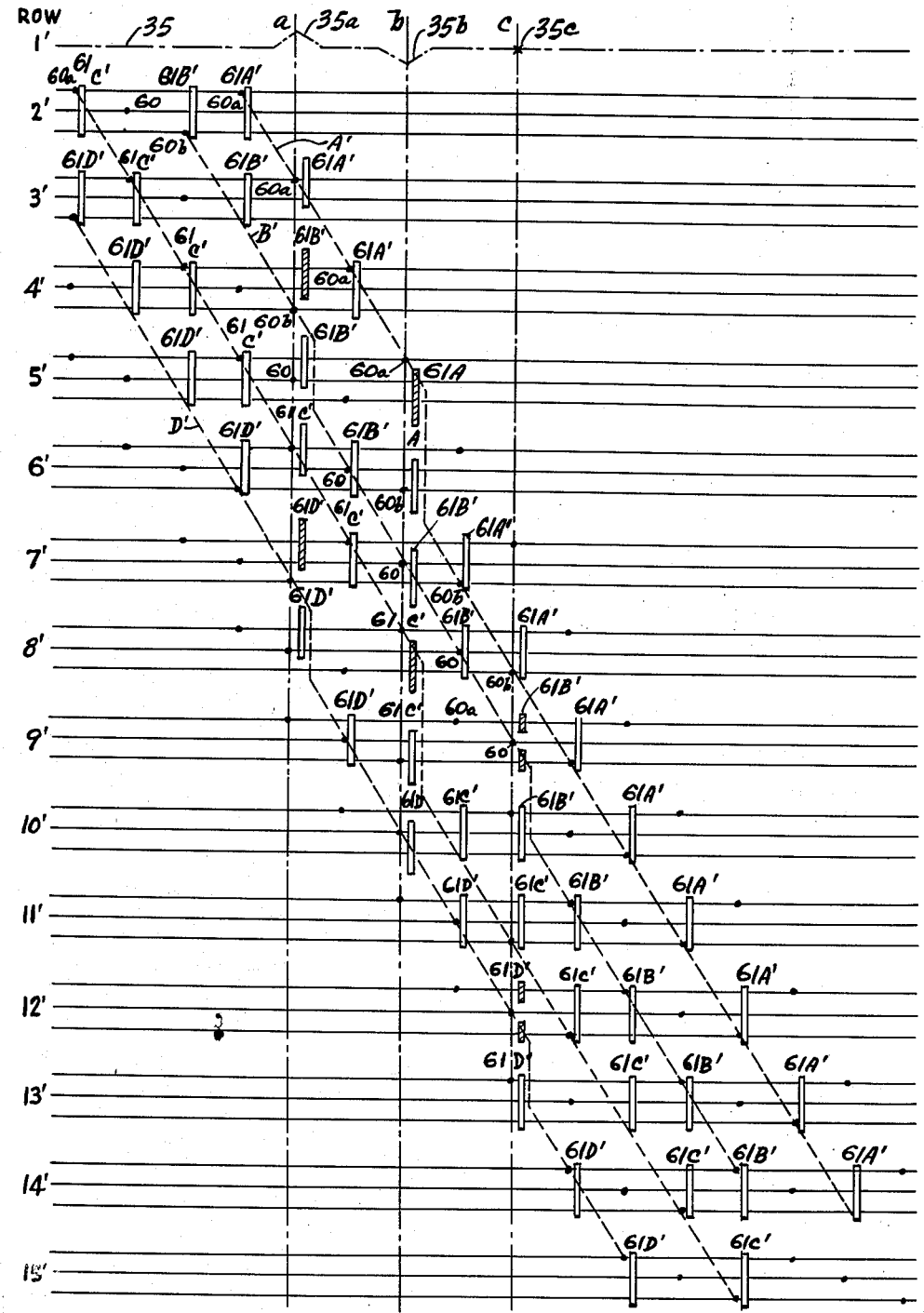

Fig. 3 is a side elevational view of an improved embodiment of the conveyor chain and trolley shown in Fig. 2, with the trolley partly in section to show an embodiment of a resilient mounting of the engaged or pushed plate thereon, and a latching device on the conveyor chain forward of the plate-engaging pin for preventing the plate and its trolley from running ahead of the conveyor chain and its driving pin;

Fig. 4 is a vertical sectional view taken along line IV—IV of Fig. 3 in the direction of the arrows, showing the latching device for the plate on the trolley;

Fig. 5 is a side elevational view with parts broken away of one embodiment of a trolley stopping station along two parallel tracks, similar to those shown in Fig. 1, wherein the driving pin is moved out of engagement with the plate on the trolley by a fixed cam along the conveyor track at the stopping station, and showing a trolley braking means to stop the coasting of the trolley after disengagement with the driving pin;

Fig. 6 is a vertical view taken along VI—VI of Fig. 5 in the direction of the arrows;

Fig. 7 is a plan view of sections of a pair of tracks similar to those shown in Fig. 1, showing horizontal offset portions at two different trolley stopping stations for disengaging the trolley driving pins, instead of the cam means as shown in Fig. 5;

Fig. 8 is a vertical section taken along line VIII—VIII of Fig. 7 in the direction of the arrows showing one of the two different driving pins on a conveyor in engagement with a driven plate on a trolley;

Fig. 9 is a vertical section taken along IX—IX of Fig. 7 showing the position of the same driving pin shown in Fig. 8 by-passing and disengaged from its trolley so that said trolley is stopped at that station;

Fig. 10 is a vertical section taken along line X—X of Fig. 7, showing another driving pin on the conveyor in a position for picking up the stopped trolley in Fig. 9;

Fig. 11 is a vertical section taken along line XI—XI of Fig. 7 showing the driving pin of Fig. 10 driving the trolley along the normal parallel tracks of the system, similar to that shown in Fig. 8;

Fig. 12 is a vertical section taken along line XII—XII of Fig. 7 showing the driving pin of Figs. 10 and 11 disengaged from the trolley at another station opposite to that shown in Fig. 9;

Fig. 13 is a vertical section taken along line XIII—XIII of Fig. 7 showing the picking up of the stopped trolley from the position shown in Fig. 12 by an engaging pin similar to that shown in Figs. 8 and 9;

Fig. 14 is a schematic time and position diagram for a conveyor system according to Figs. 7 through 13 with the trolley track shown as a dot-dash line along the top row 1 and the driving pins along the conveyor located in alternate positions along the parallel lines shown in horizontal rows 2 through 12, and dotted jagged diagonal lines showing the movement of two successive trolleys through two trolley stopping stations $a$ and $b$;

Fig. 15 is a side elevational view of a section of a pair of tracks similar to that shown in Fig. 1, in which one of the trolley stopping stations is provided by a slightly downwardly offset track section, which may be employed in addition to the lateral offset station sections shown in Fig. 7 corresponding to a third and middle driving pin position on the conveyor;

Fig. 16 is a vertical section taken along line XVI—XVI of Fig. 15 in the direction of the arrows, showing a shorter centrally located driving pin moving a trolley;

Fig. 17 is a vertical section taken along XVII—XVII of Fig. 15 showing the disengaging position for the short central driving pin shown in Fig. 16 to stop the trolley at the station shown in Fig. 15;

Fig. 18 is a vertical section taken along line XVIII—XVIII of Fig. 15 showing how the stopped trolley of Fig. 17 may be picked up by a following longer side driving pin as shown in Fig. 11;

Fig. 19 is a vertical section taken along line XIX—XIX of Fig. 15 showing the longer driving pin of Fig. 18 moving a trolley along the normally spaced section of track, similar to that shown in Fig. 16 or 11;

Fig. 20 is a sectional view similar to Fig. 17, but showing a different embodiment for the central driving pin and driven plate on a trolley in which all three of the possible driving pins are the same length and a notch is cut in the top center of the driven plate for the free passage of the central pin when passing through the station shown in Fig. 15;

Fig. 21 is a sectional view similar to Figs. 17 and 20, of another different embodiment for a three-driving-pin-position system, in which an L-shaped driving pin is employed that may be turned in any one of four positions to pass through a notched driven plate, or contact either side of the notch in the plate for use in the system shown in Figs. 7 and 15; and Fig. 22 is a schematic time and position diagram, similar to Fig. 14, for a conveyor system combining both lateral and vertical offset track portions at trolley stopping stations as disclosed in Figs. 7 and 15, and providing three different types of positions for the driving pins along a conveyor chain whereby alternate trolleys are successively deposited at two of the three stations $a$ and $c$, while the intermediate trolleys are deposited only at the other station $b$.

Although the system of this invention is adapted to many different types of conveyor tracks in which a continuously moving conveyor or transporting device is guided along one track adjacent to another track along which separate trolleys are pushed by engaging means on the conveyor, the embodiments of this invention have been adapted to a type of dual track conveyor chain and trolley system similar to that produced by the Teleflex firm in London, portions of which system are shown in Figs. 1 and 2.

*(I) The tracks*

Referring specifically to Fig. 1, there is disclosed in perspective a view of a part of a section of a pair of adjacent tracks 30 and 35 for the chain and trolleys shown in Fig. 2, one and the upper of which tracks 30 may be composed of four angle iron strips or rails 31 located so their cross-sections form the inner corners of a cross at the corners of a square, which rails 31 may be held in position by transverse plates 32 with cut-out portions through which the conveyor chain and trolleys may pass and to which cut-out edges of the rails may be attached or welded. These plates 32 may be attached or welded to a support, such as the angle iron strips 33, which may be anchored to brackets or the ceiling of a room through which the conveyor passes. Also mounted by and in the same plates 32 below the track 30 are the rails 36 forming a similar second and the other track 35 adjacent and substantially parallel to the track 30. The cut-out portion in the plates 32 connects the two cross-shaped track apertures through the opening 37 and is open at one side, herein at the bottom 38 for the passage of depending article supporting means on the trolleys which travel along the track 35.

(II) The transporting chain

Thus the substantially parallel tracks 30 and 35 provide guides for a driving conveyor chain 40 as shown in Fig. 2 and the separate trolleys 50, respectively. The conveyor chain 40 may be composed of pairs of link strips 41 pivoted at their ends in symmetrical connecting cross-bearing members 42. The outer four ends of these members 42 are thus provided with pivot shafts 43 both for the ends of the links 41 and for guide rollers 44 which engage the faces of the rails 31 in the arms of the cross-shaped cross-section along the conveyor track 30. These rollers 44 have diameters slightly less than the vertical or horizontal distances between adjacent rails 31, so as to guide the conveyor chain 40 in all slopes, bends and/or curves of the track 30 through three-dimensional space.

(III) The trolleys

In Fig. 2 below the transporting or conveyor chain 40 there is shown one separate trolley 50 which may comprise one link section like that of the conveyor chain and have two parallel side links 51 pivoted to two end cross members 52 having end shafts 53 for both the ends of the two links 51 and for eight guide rollers 54 which engage against the faces of the rails 36 in the track 35, similar to the rollers 44 for the conveyor chain in track 30.

Since the trolleys 50 are the article and goods carrying members of the system, there may be attached between their links 51 near their centers a bridging member or block 55 as shown in Fig. 2, or a U-bracket 55' as shown in Figs. 3 and 4, from which may depend a supporting post 56 which moves freely through the opening 38 provided along the bottom of the lower track 35, and which may have connected to its lower end a swivel 57 and a hook 58 for the supporting, for example, of mail bags or similar articles to be carried by the trolleys 50 and which are to be moved along the track 35 by the conveyor 40.

(IV) The driving means

The driving means for moving the trolleys 50 with the conveyor 40 may comprise a driving pin 60 (see Fig. 2) depending beyond the path of the rollers 44 from a link section of the conveyor 40 to push against a driven plate 61 mounted on and extending above the trolley 50. These members 60 and 61 pass through the open space 37 connecting the two cross sectional cross-shaped tracks 30 and 35 as shown in Fig. 1. The depending driving pin 60 may be mounted on a member 62 as shown in Fig. 2 connected between the centers of one pair of vertically parallel links 41, which bracket 62 may be U-shaped and provided with one or more apertures 63 into different ones of which driving pins may be mounted for reasons which will be described later. Similarly, the driven plate 61 may be mounted on a member 55 between the two links 51 of the trolley 50 so as to project above and beyond the path of the rollers 54 to be engaged by the depending pin 60. Thus, as shown in Fig. 2, with the conveyor 40 travelling from the right to the left in the direction of the arrow, the pin 60 will push the trolley 50 by engagement against the plate 61 to push the trolley 50 from the full line position shown to its dotted line position 50' and on along its track 35.

In order to prevent too great a shock engagement when a driving pin 60 on a continuously moving conveyor contacts or engages a plate 61 such as for a fast moving conveyor 40, either the pin 60 or the plate 61 may be resiliently mounted. In Figs. 3 and 4 the plate 61 is shown so resiliently mounted on a sleeve 63' which may slide longitudinally of the trolley carriage 50 along a horizontal guide rod 64, which is preferably splined or square as shown, to prevent rotation of the sleeve and plate from its upright position. This sleeve 63' is then urged into its central position on the rod 64 by a pair of helical springs 65 which absorb the shock when the moving pin 60 engages the stationary plate 61 of a heavily loaded trolley 50 that may be at rest at a loading station along the track 35. The ends of the guide rod 64 may be mounted or fastened to the centers of the cross end connecting members 52 which carry the guide rollers 54.

In order to insure that the plate 61 of the trolley will always engage the abutting forward edge of the driving pin 60, even when the conveyor goes down an incline and the weight of the load on the trolley 50 is sufficient to cause the trolley to run ahead of the conveyor 40, there may be provided a latch member 70 mounted on a pivot 71 between the links 41 of the chain 40 and forwardly of the driving pin 60 and its support 62, which latch 70 may be normally dependent by its own weight or a spring (not shown) into the full line position shown in Figs. 3 and 4 so that as the front part of the conveyor 40 passes the plate 61 the latch 70 will be pivoted in a clockwise direction to permit the plate 61 to pass and then moves back into said full line position in front of the plate 61. This counter clockwise movement of the latch 70 can be limited by an integral arm 72, which can engage the bridging member 62 to thereby stop the plate 61 and its trolley from running ahead of the conveyor 40. Although the resilient mounting 63', 64 and 65 for the driven means 61 and the mount of the latch 70 as shown in Figs. 3 and 4 are not shown in the other figures of the drawings, it should be readily understood that these features may be added to the other embodiments of this invention without departing from this invention, in that these details have been eliminated therefrom merely for the purpose of clarifying the disclosure and operation of the system.

(V) The releasing means

As will be described later in connection with Figs. 7 through 21, one of the manners in which the driving means or pin 60 can be disengaged from the driven means or plate 61 is by slightly offsetting either the track 30 or 35 at the stations in which disengagement and stopping of a trolley is to occur, so that a pin in one location on support 62 such as one of the holes 63 shown in Fig. 2, will become disengaged with an edge of the plate 61 while another pin in another location or hole 63 on a following link of the conveyor chain 40 will pick up automatically the plate 61 at that station and move the trolley on. These offset sections of the track may be either lateral of the plane of the two tracks 30 and 35 that is horizontally, and/or vertically, if desired.

(V)–A Movable engaging means

Another manner of disengaging the pin with the plate is to employ absolutely parallel tracks 30 and 35 and move the pin or plate itself by the action of a fixed cam mechanism. Referring now to Figs. 5 and 6, there is shown an embodiment in which a driving pin 80 on the conveyor 40 is mounted in a sleeve 82 on the bridging member 62 between the links 41. The driving pin 80 may be provided with a collar 83 against which a spring 83' presses from the lower side of the support 62 or lower end of sleeve 82 to maintain the driving pin 80 normally in its downwardly extended position 80' as shown in dotted lines in Figs. 5 and 6, so as to engage the plate 61 on the trolley 50. However, at a station in which the trolley 50 is to be stopped for a definite period of time, the pin 80 may be raised by engagement of its upper end flange or overhanging cap plate 84 over a fixed cam strip 85 which can be mounted on brackets 86 connected to the conveyor supporting rails 33.

The vertically slidable driving pin 80 is preferably grooved or formed of a square cross section with a complementary hole therefor in the sleeve 82 so as to prevent turning of the pin 80 around its vertical longitudinal axis, and to insure that the offset cam engaging cap plate 84 will always extend in the same direction and engage only those cams 85 which occur on the same side of the track 30. Thus when a trolley 50 has been disengaged by the pin 80 as shown in Figs. 5 and 6, it still can be picked up automatically by a following pin 80 having its overhanging cap plate 84' (shown in dotted lines in Fig. 6) extending away from the cam strip 85 so as not to be raised thereby and to engage the plate 61 to move the trolley 50 on. However, at another station a cam plate 85 on a bracket 86 may be mounted on the opposite side of the conveyor track 30 to engage the offset section 84' so as to raise the pin 80 connected thereto and thus cause the trolley 50 to stop at that other station.

It is possible with the driving pins 80 along the track having alternate extending cap plates 84 and 84', and similarly alternately cooperating fixed cams 85 on opposite sides of the track 30 at successive stations, that each trolley 50 driven by the transporting chain 40 along the track 30 will be stopped automatically at successive stations and picked up by the following driving pin 80, thereby remaining at each station for the period of time required for the driving chain 40 to travel the distance between successive driving pins 80 located along the chain, as will be described later in connection with Fig. 14.

In order to insure stopping of the trolley 50 when it is disengaged by driving means or pin 60 or 80 there may be provided along the track 35 at the station where the trolley 50 is to be stopped, a flexible friction engaging brake means 90 which may comprise a leaf spring fastened to a bracket 91 that may be attached or welded to the outside of one of the upper rails 36 at each trolley stopping station, so that the side edge of the plate 61 will frictionally engage against the leaf spring 90 to restrict it and its trolley 50 from freely moving along the track 35. However, the friction of the spring 90 should be adjusted so that it will not unduly restrict picking up of the trolley 50 by a successive driving pin, which must pick up the trolley and move it past the end of the leaf spring 90 for further travel along the track 35.

*(V)–B Offset tracks*

Referring now to Figs. 7 through 14, there is disclosed another embodiment of this invention in which the track 35 for the trolley 50 is offset laterally either to the left as shown for section 35a or to the right as shown in section 35b in Fig. 7. The offset track sections 35a and 35b may be supported by plates 32a and 32b with correspondingly offset cross-shaped apertures therein as shown in Figs. 9 and 10, and 12 and 13, respectively, so that the offset sections of the rails 36a and 36b will be guided properly and the right amounts for disengagement of only the desired different types of driving means or pins with the plates 61. These different types of driving means herein comprise driving pins 60b and 60a mounted on opposite sides of the bridging member 62 between the links 41, so as to pick up respectively plate 61 on the trolley 50 when they are offset in track sections 35b and 35a, respectively, having been disengaged or stopped in those sections by disengagement of the pins 60a and 60b, respectively, from the plate 61.

This mechanism is more clearly illustrated by reference to the sections taken across the Fig. 7 as disclosed in Figs. 8 through 13. In Fig. 8, the pin 60b which is shown to the right of the support 62, normally engages the right side of the plate 61 and pushes it along the track 35. However, when the track 35 is offset to the left as shown in Fig. 9 into offset track section 36a, then the pin 60b rides clear or free of the edge of the plate 61 as shown in Fig. 9, so as to stop the trolley 50 in the section 35a until the first pin 60a passing thereafter, which is on the left side of the bracket 62 as shown in Fig. 10, picks up the trolley 50 by engaging the upper right corner of the plate 61, and pushes it back into the normal track section as shown in Fig. 11 where the relative position of the pin 60a moves over to the left side of the plate 61, but still engages the plate 61. Then the pin 60a is disengaged from the plate when the trolley 50 is pushed into the offset section 35b to the right as shown in Fig. 12, so that the trolley 50 remains in the offset section of the track 35b until the next pin 60b, similar to that shown in Figs. 8 and 9, engages the upper left side of the plate and moves the trolley back onto the track 35 as shown in Fig. 8.

Referring now to Fig. 14, there is a schematic time space diagram of the successive paths of three plates 61A, 61B and 61C on three separate successive trolleys as they pass along the track 35 and by and through the stations a and b, schematically indicated by the two vertical dot dash lines at the offset portions 35a and 35b along the track 35 shown along row 1 at the top of the diagram. Rows 2 through 12 disclose the two parallel paths for the pins 60a and 60b which are located alternately along the conveyor chain 40 as indicated by the dots alternately spaced along each pair of these lines. In front of every other or second one of the driving pins, in row 2 in front of each driving pin 60b, there is shown schematically a vertically elongated rectangle for the plate 61, with successive ones associated with separate trolleys being given separate reference characters 61A, 61B and 61C. The location of these plates and their trolleys are followed through the rows 2 through 12 by the jogged diagonal dotted lines A, B and C, with the jogs occurring at the stations where the plates and their corresponding trolleys are stopped (the stopped plates being shown shaded) until picked up by a successive driving pin.

Thus following, for example, line A from row 2 for the path of a trolley and its plate 61A, it is seen first at the top of line A in the position shown in Fig. 8, and then as it reaches the station a the pin 60b is disengaged from the plate 61A in row 3 (see Fig. 9) and passes on to a position half way between stations a and b as shown in row 4 until the plate 61A is picked up in row 4 by the pin 60a (see Fig. 10) and moved into the position shown in row 5 (see Fig. 11) and on until it reaches station b in row 6 where the pin 60a by-passes the opposite edge of the plate 61A (see Fig. 12). The trolley and its plate 61A stops at station b and remains there until the next pin 60'b engages it in row 7 (see Fig. 13) and carries it on through rows 8, 9, 10, 11 and 12 (see Fig. 8). Similarly, for the following plates 61B and 61C, they start out along their lines B and C in the positions shown in Fig. 8 as plate 61A did and follow through exactly the same sequence of steps along their lines B and C as the plate 61A previously described along line A.

Thus, it can be seen that each one of the trolleys corresponding to plate 61A, 61B and 61C are stopped for a definite period of time and automatically picked up at each one of the stations a and b in succession, in accordance with the way the driving pins 60a and 60b are located along the transporting conveyor chain 40. However, if other sequences of stopping and by-passing are desired, the pins 60a and 60b may be placed in different sequences along the chain 40, so that the trolley may stay a longer period of time at one station than another or may even by-pass some stations.

*(V)–B-2 Three driving pins*

Still further embodiments of the system of this invention are shown in Figs. 15 through 22 in which a downwardly vertical offset section 35c of the track 35 is provided in Fig. 15 together with an additional third or center driving pin 60 which may be of shorter length than the other two pins 60a and 60b. The rails 31 and 36c of this downwardly offset section 35c may be supported by the cut out plates 32c, as shown in Figs. 17, 18 and 19.

The arrangement shown in Figs. 15 through 19 is such that for the normal movement of the trolley 50 along the track 35 the shorter center driving pin 60 engages the center upper portion of the driven plate 61 as shown in Fig. 16. However, as the section 35c offsets below the track 30, the lower end of the pin 60 passes over the top edge of the plate 61 as shown in Figs. 15 and 17, and the trolley 50 remains stationary in the station corresponding to offset section 35c until one or the other of the longer driving pins 60a or 60b engages one or the other corner of the plate 61 as shown in Fig. 18 and picks up the trolley to move it on along the track 35 until it is in normal position and the pin moves farther down along the plate as shown in Fig. 19. Thus, if longer driving pin 60a or 60b on either side of the support 62 between the links 41 of the chain can pick up the plate 61 on the trolley when it is in its lower offset section 35c another type of sequence can be produced wherein certain trolleys will only be stopped at one type of offset stations while other of the trolleys will be stopped at two other types of offset stations, that is, trolleys which are continually pushed by either one of the longer pins 60a or 60b will not be stopped at the station corresponding to the offset section 35c. This will be more clearly described in connection with the time-place diagram shown in Fig. 22, similar to Fig. 14 but also including the vertically offset station c.

Instead of employing a central driving pin 60 shorter than the two side pins 60a and 60b, a central pin 60c the same length as the pins 60a and 60b, may be employed but then the plate 61c must be provided with a notch in its center, to compensate for the similarly length central pin as shown in Fig. 20 and to operate along the tracks 35, 35a, 35b and 35c shown in Figs. 7 and 15.

Still another three-way driving pin embodiment is shown in Fig. 21, in which a centrally notched driven plate 61c similar to that shown in Fig. 20 is attached to the trolley 50, but instead of employing three pins, a single pin 60d having an L-shaped lower end 66 that may be clamped in member 62 to extend in either a forward or backward position as shown in Fig. 21, or to extend either to the right or left as shown in dotted lines at 66a and 66b. Maintenance in these pre-set positions can be insured by an off-round or square section 67 on the part of the pin which fits into the bridging member or block 62, with a complementary cross-sectional hole in the block 62 plus a clamping nut 68 or the like threaded on the upper end of the pin 61d. Thus by mounting the pin 60c in three of its four possible different positions, the same result can be obtained, as with the three separate pins disclosed in the embodiments of Figs. 16 through 20.

Now referring to the schematic time-place diagram of Fig. 22, any one of the embodiments disclosed in Figs. 7 and 15 through 21, of combinations of three different driving pins may be employed for stopping the trolleys 61B' and 61D' at stations a and c while the intermediate trolleys 61A' and 61C' only stop at station b. According to path A' for the trolley and its driven plate 61A' as started in row 2', a pin 60a engages one side of the plate 61A' (see Fig. 18 or 11) and moves it from the position shown in row 2' into the position shown in row 3' where the pin 60a presses against the center of the plate 61A' but still pushes it through and past the station a back into the position in row 4' where it takes the same position as it did in row 2', and then on into the station b in row 5' where it passes by the outside edge of the plate 61A' to stop the plate 61A' (see Fig. 9). Since the three pins 60a, 60 and 60b are arranged sequentially in Fig. 22 on successive driving links of the chain 40, as shown by dots on the three parallel horizontal lines in each of the rows 2' through 15', the next pin which will pass the plate 61A' in row 5' is a pin 60b which will pick up the plate 61A' in row 6' and push it on into the straight section of the track and thereafter continue to engage the edge of the plate throughout rows 7' through 15' similar to that shown in Fig. 8. Even at station c the lower offset section 35c does not disengage the pin 60b, since it is sufficiently long to maintain its engagement with the plate 61A', as pin 60a does in Fig. 18. The movement for plate 61C' is the same as for plate 61A' just described as shown by its path C' parallel to path A' in Fig. 22.

The paths B' and D' for plates 61B' and 61D' which are parallel in Fig. 22, differ from paths A' and C' in that the plate 61B' or 61D' is first pushed in row 2' by the pin 60b as shown in Fig. 8 and thence on through row 3' to row 4' and station a where it slides off the edge of the plate 61B' and stops. The pin 60b thus passes the edge of the plate 61B' and the plate is not picked up until the short center pin 60 in row 5' contacts or engages the edge of the plate 61B' (similar to that for pin 60b shown in Fig. 8) and moves the plate 61B' on into the position shown in row 6' which is similar to that shown in Fig. 16. This engagement by pin 60 continues on past the station b, in that the plate 61B' is not sufficiently displaced to avoid the shorter pin 60 as shown in row 7', and thence back into the position of Fig. 16 in row 8' and then into the station c. Here, in order to show that the pin 60 passes by the plate 61B' the plate is shown to be notched or broken open at the center (similar to that shown in Figs. 20 and 21) however, it also applies to the plate disengagement shown in Fig. 17. Thus, the plate 61B' rests in row 9' until the next pin 60a picks up its corner as shown in row 10' and then carries it on through the rest of the rows 12' through 15' in the positions similar to those shown respectively in Figs. 18 and 19.

Thus it can be seen that with different arrangements of the pins 60, 60a, 60b and/or 60c along the three different parallel lines or paths shown in each of the rows 2' through 15' in Fig. 22, different combinations can be set up for moving separate trolleys along a track and stopping them at different ones of the stations in a given predetermined sequence or order, depending upon which position pin or type of driving means follows another position pin or different type of driving means along the transporting conveyor.

While there is described above the principle of this invention in connection with specific apparatus, it is to be clearly understood that this description is made only by way of example and not as a limitation to the scope of this invention.

What is claimed is:

1. A conveyor system comprising: a pair of adjacent tracks, a pusher type of conveyor movable along one of said tracks, a plurality of separate trolleys movable along the other of said tracks, a plurality of driving means projecting from and located at spaced intervals along said conveyor for engagement with said trolleys to move them along said track, said driving means being of more than one type, each type having a different relative position with respect to said conveyor, said different types of driving means having corresponding different relative engageable positions with respect to said trolleys, and means associated with one of said tracks at different spaced locations along said tracks for causing relative movement between the engageable driving means and the trolleys for disengagement of one type of said driving means with one trolley while another and subsequent type of said driving means engages said trolley, whereby said trolley rests on its said other track at said location for the time it takes said other type of said driving means to be moved by said conveyor to engage said resting trolley after it was disengaged by said one type of said driving means.

2. A system according to claim 1 wherein said different types of driving means comprise differently positioned driving pins mounted on said conveyor which extend into a path of a driven plate mounted on said trolleys.

3. A system according to claim 2 including means on said conveyor whereby said pins may be located in any one of a plurality of fixed positions.

4. A system according to claim 1 wherein said means for disengagement of different types of said driving means include different offset sections of one of said tracks relative to the other of said tracks.

5. A system according to claim 1 wherein said means for disengagement of different types of said driving means include different cam means for moving each of said different types of driving means on said conveyor away from said trolleys at different ones of said locations.

6. A system according to claim 1 including means at spaced locations along said conveyor for anchoring said driving means, and means for removing and replacing said driving means in different ones of said anchoring means.

7. A system according to claim 1 wherein said pairs of tracks are substantially parallel and spaced vertically one above the other.

8. A system according to claim 7 wherein said conveyor moves along the upper track and said driving means projects downwardly therefrom; and said trolleys move along the lower track and include driven means projecting upwardly from said lower track and engageable with said driving means.

9. A system according to claim 7 wherein said trolleys include means for suspending articles therefrom extending below said lower track.

10. A system according to claim 1 wherein said driving means include differently positioned driving pins mounted on said conveyor, and a driven plate mounted on each one of said trolleys engageable with at least one of said driving pins.

11. A system according to claim 1 wherein said conveyor is an endless conveyor.

12. A system according to claim 1 including means at at least one of said locations for braking the movement of said trolley means after it has been disengaged by its said driving means.

13. A system according to claim 1 including means adjacent said driving means on said conveyor for maintaining said trolley in engagement with said driving means when it is being moved by said conveyor.

14. A system according to claim 13 wherein said means for maintaining engagement includes a pivoted latch means.

15. A conveyor system comprising: a pair of adjacent tracks, a pusher type of conveyor movable along one of said tracks, a plurality of separate trolleys movable along the other of said tracks, a plurality of driving means projecting from and located at spaced intervals along said conveyor for engagement with said trolleys to move them along said track, said driving means of more than one type, each type having a different relative position with respect to said conveyor, said different types of driving means having corresponding different relative engageable positions with respect to said trolleys, and means along said other track for moving one of said driving means relative to one of said trolleys for automatically disengaging said one of said types of different driving means from said one trolley and subsequently automatically engaging another type of said different driving means with said one trolley, whereby said one trolley rests on said other track where it was disengaged until said other type of driving means is moved by said conveyor into engagement with said one trolley to pick it up and move it again along said other track.

16. A system according to claim 15 wherein said conveyor is a continuous chain of links and said different driving means are located at different spaced links along said chain and project therefrom toward said other track, and said trolleys are provided with driven means engageable by said driving means projecting therefrom toward said one track.

17. A system according to claim 16 wherein said different driving means comprise driving pins having engageable ends located in different positions transverse to the movement of said conveyor.

18. A system according to claim 17 wherein said driving pins comprise at least two pins, one on each side of said conveyor chain.

19. A system according to claim 17 wherein said driving pins have an offset engageable end, and means on said chain for clamping said pins so said offset end may project in any one of four different directions at right angles to each other.

20. A system according to claim 17 wherein at least one of said plurality of different driving pins has a different length than the other of said driving pins.

21. A conveyor system comprising: a pair of adjacent tracks, a pusher type of conveyor movable along one of said tracks, a plurality of separate trolleys movable along the other of said tracks, a plurality of driving means projecting from and located at spaced intervals along said conveyor for engagement with said trolleys to move them along said track, said driving means being of more than one type, each type having a different relative position with respect to said conveyor, said different types of driving means having corresponding different relative engageable positions with respect to said trolleys, said other track having differently positioned offset sections at various locations along its length for guiding said trolleys out of relative engagement with corresponding different ones of said driving means to stop the motion of their corresponding trolleys until an engageable driving means moves along to engage said stopped trolleys and start them moving again along said track.

22. A system according to claim 21 wherein said different driving means comprise driving pins mounted on said conveyor.

23. A system according to claim 22 including means for replacing and adjusting the position of said driving pins relative to said conveyor.

24. A system according to claim 21 wherein said one track is above the other track and said different driving means project downwardly from said conveyor.

25. A system according to claim 21 wherein each of said trolleys include a driven plate mounted on said trolley for engagement with said different driving means.

26. A conveyor system comprising: a pair of adjacent tracks normally parallel to each other, a chain conveyor moving continuously along one of said tracks, a plurality of separate trolleys movable along the other of said tracks, a plurality of driving pins projecting from and located at spaced intervals along said conveyor for engagement with said trolleys to move them along said track, said driving pins being of more than one type, each type having a different relative position with respect to said conveyor, said different types of driving pins having corresponding different relative engageable positions with respect to said trolleys, and different guide means for changing the relative position between said correspondingly different driving pins and said trolleys to stop the trolley of that corresponding driving pin by disengagement from said trolley until a different type of driving pin moves along to engage said stopped trolley and automatically start it moving again with said conveyor chain.

27. A system according to claim 26 wherein said conveyor chain comprises a plurality of links connected at joints having two pairs of guide rollers at right angles, and said track comprises rails arranged to provide a guide way having a cross-shaped cross section for said rollers.

28. A system according to claim 27 wherein said trolleys correspond to a single link unit of said chain conveyor having two pairs of guide rolls at right angles at each end of said trolley, and said other track comprises rails arranged to provide a guide way having a cross-shaped cross section for said trolley rollers.

29. A system according to claim 26 wherein said different guide means comprise offset track sections corresponding to each different position of driving pin.

30. A system according to claim 29 wherein said offset track sections are offset horizontally with respect to the center line of said other track.

31. A system according to claim 29 wherein said offset track sections are offset horizontally and vertically with respect to the center line of said other track.

32. A system according to claim 29 comprising three different types of driving pins and correspondingly three different types of offset sections of said other track, whereby certain of said trolleys stop at alternate offset track sections while others stop at intermediate offset track sections.

33. A system according to claim 26 having two different types of driving pins which are alternately spaced along said conveyor chain whereby successive trolleys are stopped for the time said conveyor chain moves the distance between successive driving pins at each different guide means.

34. A system according to claim 26 wherein said driving pins are movable relative to said conveyor chain and said different guide means comprise cam means along said one track of said conveyor chain for moving said driving pins on said conveyor chain away from said trolleys.

References Cited in the file of this patent

UNITED STATES PATENTS

| | | |
|---|---|---|
| 1,297,680 | Hanak | Mar. 18, 1919 |
| 1,420,115 | Lange | June 20, 1922 |
| 1,775,545 | Anderson | Sept. 9, 1930 |
| 2,101,353 | Waalkes | Dec. 7, 1937 |
| 2,344,155 | McBride et al. | Mar. 14, 1944 |
| 2,527,244 | Culver | Oct. 24, 1950 |
| 2,567,438 | McBride | Sept. 11, 1951 |
| 2,580,758 | Gibson | Jan. 1, 1952 |
| 2,612,847 | Burrows | Oct. 7, 1952 |
| 2,635,555 | Hansson | Apr. 21, 1953 |
| 2,684,039 | King | July 20, 1954 |
| 2,688,936 | Brooks | Sept. 14, 1954 |
| 2,714,355 | Benson | Aug. 2, 1955 |
| 2,789,685 | Orwin | Apr. 23, 1957 |

FOREIGN PATENTS

| | | |
|---|---|---|
| 766,453 | Great Britain | Jan. 23, 1957 |